United States Patent
Tsukada et al.

(10) Patent No.: US 8,646,255 B2
(45) Date of Patent: Feb. 11, 2014

(54) EXHAUST GAS PURIFICATION SYSTEM FOR ENGINEERING MACHINE

(75) Inventors: Hidenobu Tsukada, Ushiku (JP); Kouji Ishikawa, Kasumigaura (JP); Yasushi Arai, Tsuchiura (JP); Shohei Kamiya, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 1124 days.

(21) Appl. No.: 12/578,702

(22) Filed: Oct. 14, 2009

(65) Prior Publication Data

US 2010/0122522 A1    May 20, 2010

(30) Foreign Application Priority Data

Nov. 17, 2008    (JP) .................................. 2008-293582

(51) Int. Cl.
  *F01N 3/00*    (2006.01)
  *F01N 3/02*    (2006.01)
(52) U.S. Cl.
  USPC .................................. 60/295; 60/297; 60/311
(58) Field of Classification Search
  USPC ............................ 60/276, 285, 295, 297, 311
  See application file for complete search history.

(56) References Cited

U.S. PATENT DOCUMENTS

| 4,884,398 A | 12/1989 | Morita et al. | |
| 7,316,107 B2 * | 1/2008 | Aratsuka et al. | 60/297 |
| 7,845,165 B2 * | 12/2010 | Satou et al. | 60/295 |
| 2008/0053074 A1 | 3/2008 | Verkiel | |

FOREIGN PATENT DOCUMENTS

| EP | 1 852 581 A1 | 11/2007 |
| JP | 6-235314 A | 8/1994 |
| JP | 3073380 B2 | 6/2000 |
| JP | 2004-251278 A | 9/2004 |
| JP | 2005-120895 A | 5/2005 |

* cited by examiner

*Primary Examiner* — Thomas Denion
*Assistant Examiner* — Diem Tran
(74) *Attorney, Agent, or Firm* — Mattingly & Malur, PC

(57) ABSTRACT

An exhaust gas purification system for an engineering machine is capable of avoiding decreases in working efficiency during regeneration control by burning off a deposit of particulate matter from a filter efficiently during a work pause time. An operating section 17 of a display monitor 16 is used to set a work pause time and a work pause switch 13 notifies a vehicle body control unit 21 that the hydraulic excavator has entered a work pause state. In response, the vehicle body control unit 21 calculates the time required for a regenerating device to burn off the current amount of particulate matter deposited on the filter, and when the calculated time is longer than the preset work pause time, a regeneration controller 4a of an engine control unit 4 is activated, and a solenoid control valve 15 is switched to a closed position during the preset work pause time.

10 Claims, 10 Drawing Sheets

RELATIONSHIP BETWEEN DPF DIFFERENTIAL
PRESSURE ACROSS FILTER AND DEPOSITED
PM AMOUNT

RELATIONSHIP BETWEEN REGENERATING
REQUIREMENT TIME AND DEPOSITED PM AMOUNT

EXHAUST GAS PURIFICATION SYSTEM FOR ENGINEERING MACHINE

BACKGROUND OF THE INVENTION

1. Field of the Invention

The present invention relates generally to exhaust gas purification systems for engineering machines. More particularly, the invention concerns an exhaust gas purification system for engineering machines of a traveling type, such as hydraulic excavators, each of the machines including a regenerating device to burn off a deposit of particulate matter from a filter disposed for trapping the particulate matter contained in gas emissions, and regenerate the filter.

2. Description of the Related Art

Conventional exhaust gas purification systems for purifying diesel engine gas emissions include the systems described in JP,A 2005-120895 and JP-3073380, for example. The exhaust gas purification system described in JP,A 2005-120895 has a filter, called a diesel particulate filter (DPF), in the engine exhaust line of a truck or any other transport vehicle to trap the particulate matter (PM) contained in gas emissions and reduce the amount of PM released to the outside. In order to prevent the clogging of the PM filter, the purification system in JP,A 2005-120895 is also adapted to conduct automatic regeneration control and manual regeneration control. Automatic regeneration control detects the differential pressure across the filter, then discriminates the estimated amount of PM deposited thereupon, and if this estimated amount of PM exceeds a first threshold level, increases the temperature of the gas emissions automatically to burn off the PM from the filter. Manual regeneration control, which, if the estimated amount of PM exceeds a second threshold level greater than the first threshold level, prompts an operator to start manual regeneration control under a stopped state of the vehicle by activating a warning lamp, and when the operator turns on a manual regenerating switch, increases the temperature of the gas emissions to burn off the PM deposited on the filter. The temperature of the gas emissions is increased by the oxidation of unburnt hydrocarbons (HC) due to additional fuel injection during the expansion stroke of the engine after main injection.

The exhaust gas purification system described in JP-3073380 regenerates a filter in a hydraulic engineering machine by burning off deposits from the filter after engine output has been enhanced by loading the engine in a hydraulic-like manner for an increased gas emissions temperature. The purification system in JP-3073380 the exhaust resistance of the engine due to the use of the filter and start the regeneration of the filter automatically if the exhaust resistance exceeds a permissible level.

SUMMARY OF THE INVENTION

As described in JP,A 2005-120895, the exhaust gas purification systems in trucks and other transport vehicles provide two control techniques relating to the regeneration of the filter in the purification system. One is automatic regeneration control, which is conducted during vehicle traveling, and the other is manual regeneration control, which is conducted under the stopped state of the vehicle body. If the PM deposited on the filter cannot be burned off with automatic regeneration control and the amount of PM continues increasing, manual regeneration control is usually used to remove the PM by burning. In other words, since automatic regeneration control is conducted during vehicle traveling, the amount of PM deposited on the filter during engine operation may increase above the amount of PM burn-off by regeneration, and if this actually happens, the amount of PM deposited will increase, even after the regeneration with automatic regeneration control. Manual regeneration control allows reliable burn-off of the PM deposited on the filter, since the temperature of the gas emissions is increased by additional fuel injection or the like under the stopped state of the vehicle body to burn off the deposited PM from the filter.

When applied to such a hydraulic excavator or any other engineering machine as described in JP-3073380, however, the manual regeneration control technique has the problems discussed below.

Engineering machines such as hydraulic excavators require stopping the vehicle body to operate in work mode. These machines conduct engineering work by driving a hydraulic pump with the engine and then driving an actuator, such as a boom cylinder or an arm cylinder, with an oil that is delivered from the hydraulic pump. Conducting manual regeneration control with such an engineering machine's vehicle body in a stopped condition means that the work must be stopped. The second threshold level of the amount of PM deposited during the start of manual regeneration control, however, will be relatively large and the amount of PM burned off will also be relatively great, so the regenerating requirement time will be relatively long. As a result, while the regeneration is in progress, no work will be executable and working efficiency will decrease significantly.

For an engineering machine, if a hydraulic excavator is taken as an example, such a non-working time (work pause time) as associated with a dump truck queue always occurs during excavation, dump truck loading, or other work that involves loading excavated sediments onto the load-carrying platform of a dump truck. During such a time, since the work is in pause, the engine load is light and the exhaust gas temperature of the engine is relatively low. Consequently, a natural combustion effect against the PM deposited on the filter will decrease and the filter will easily become clogged with PM.

An object of the present invention is to provide an exhaust gas purification system for an engineering machine, adapted to avoid decreases in working efficiency by burning off a deposit of particulate matter on a filter efficiently during a work pause time of the engineering machine.

(1) In order to attain the above object, the present invention provides, as an aspect thereof, an exhaust gas purification system for an engineering machine, the system including: a filter disposed in an exhaust system of a diesel engine, for trapping particulate matter contained in gas emissions; and a regenerating device for regenerating the filter by burning off the particulate matter deposited thereupon. The system further includes means for presetting a work pause time for the engineering machine, means for notifying that the engineering machine has entered a work pause state, and regeneration control means used for operating the regenerating device for the preset work pause time upon receiving the notice of the fact that the engineering machine has entered the work pause state.

In the present invention thus constructed, upon receiving the notice of the fact that the engineering machine has entered the work pause state, the regenerating device is brought into operation for the preset work pause time, so the regeneration control can be conducted that utilizes the work pause time to burn the particulate matter deposited on the filter. In addition, since particulate matter easily becomes deposited on the filter during the work pause time, the particulate matter deposited on the filter can be burned by utilizing the work pause time to reduce the deposited particulate matter efficiently. Reducing the deposit of particulate matter on the filter by burning the deposit during the work pause time in this way suppresses any increases in the amount of particulate matter deposited on the filter, thus lowers a rate at which manual regeneration control is to be requested, and avoids a decrease in working efficiency due to forced or accelerated manual regeneration control during the work.

(2) In above item (1), the regeneration control means preferably calculates a time required for the regenerating device to burn off a current amount of particulate matter deposited on the filter, and activates the regenerating device when the fact that the engineering machine has entered the work pause state is notified and the calculated time is longer than the preset work pause time.

The present invention utilizes the above-set work pause time to activate the regenerating device and conduct regeneration control. Even when the amount of particulate matter deposited on the filter is not too significant, however, the execution of regeneration control during the work pause time is likely to result in the regenerating device being activated more frequently and the engine deteriorating in fuel efficiency.

Accordingly, the present invention activates the regenerating device when the calculated time is longer than the preset work pause time. Thus, even after the notification of the fact that the engineering machine has entered the work pause state, when the calculated time is shorter than the preset work pause time, the regenerating device is not activated, which prevents frequent operation of the regenerating device and thus the deterioration of engine fuel efficiency.

(3) In above item (1), the regeneration control means may calculate the current amount of particulate matter deposited on the filter, and the amount of deposited particulate matter that the regenerating device can burn during the preset work pause time. The regeneration control means may also activate the regenerating device when the fact that the engineering machine has entered the work pause state is notified to the regeneration control means and the calculated amount of particulate matter deposited on the filter is greater than the calculated amount of burnable, deposited particulate matter.

This will also prevent frequent operation of the regenerating device and thus the deterioration of engine fuel efficiency, as described in above item (2).

(4) In above item (1), the means for notifying the fact that the engineering machine has entered the work pause state is preferably a first operating unit operated by an operator upon the notification of the fact that the engineering machine has entered the work pause state.

The regeneration control, described in above item (1), that utilizes the work pause time can therefore be started at the operator's discretion.

(5) In above item (1), the engineering machine may include a control lever operated during the work. In addition, the means for notifying the fact that the engineering machine has entered the work pause state may include a sensor that detects an operational state of the control lever, and means for judging from detection results of the sensor whether the engineering machine has entered the work pause state.

Thus, once the engineering machine has entered the work pause state, the regeneration control that utilizes the work pause time, described in above item (1), can be started automatically, even without operator intervention.

(6) In above item (1), the presetting means preferably has a second operating unit operated by the operator to enter a work pause time for the engineering machine.

This allows the operator to set an optimal work pause time at his or her own discretion according to a particular status of the working site.

(7) In above item (1), the engineering machine may further has an information storage unit to store operational data, and the presetting means may include analytical means for analyzing at predetermined time intervals the operational data stored in the information storage unit, and then using analytical results to calculate the work pause time of the engineering machine.

Hence, the work pause time can be set automatically.

According to the present invention, the amount of particulate matter deposited on the filter can be reduced efficiently by burning the deposited particulate matter during the work pause time of the engineering machine, and a decrease in working efficiency can be avoided by the regeneration control.

In addition, according to the present invention, the regeneration control that utilizes the work pause time can be conducted without deteriorating engine fuel efficiency.

DESCRIPTION OF THE PREFERRED EMBODIMENTS

Hereunder, embodiments of the present invention will be described referring to the accompanying drawings.

First Embodiment

Figure 1:
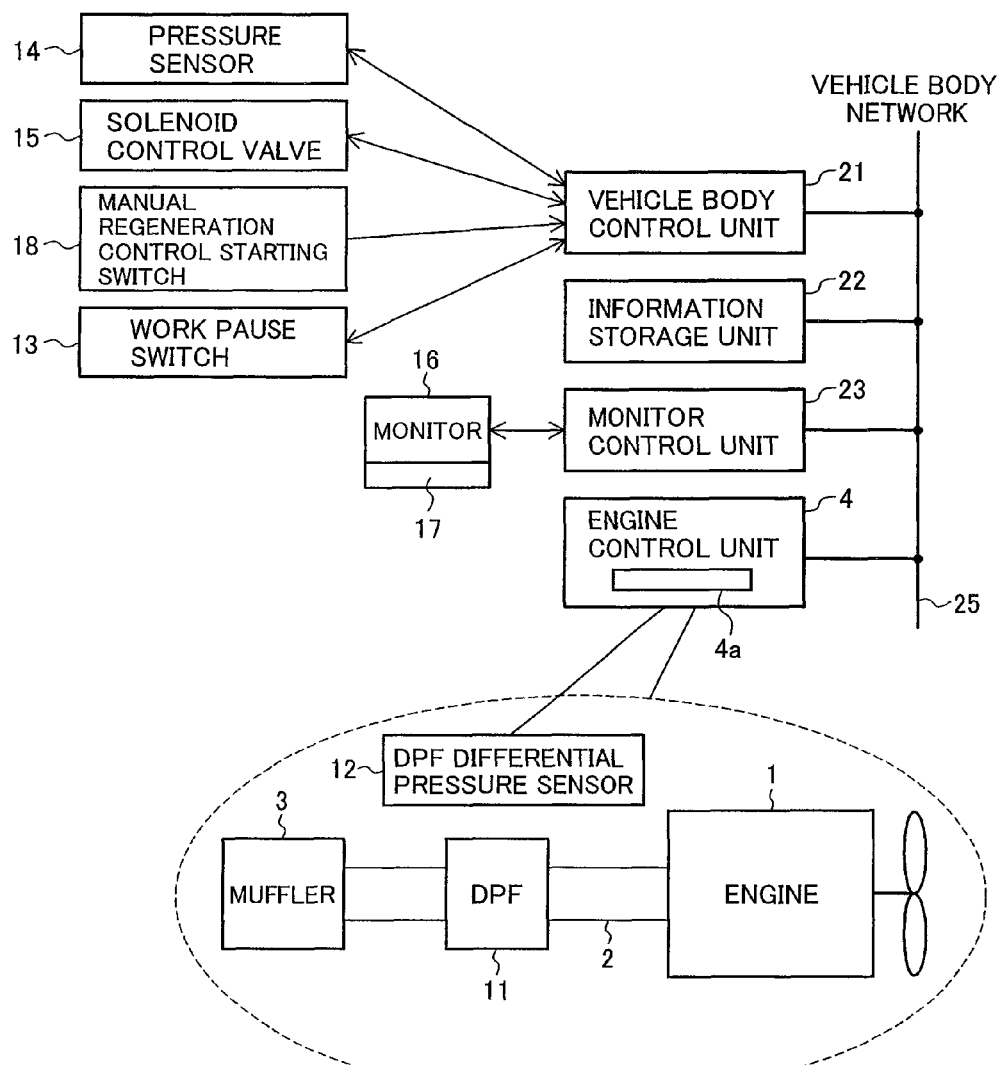
FIG. 1 is a diagram showing an exhaust gas purification system for a hydraulic excavator (engineering machine) according to a first embodiment of the present invention.

Total System Configuration:

FIG. 1 is a diagram showing an exhaust gas purification system for a hydraulic excavator (engineering machine) according to a first embodiment of the present invention.

Referring to FIG. 1, reference number 1 denotes a diesel engine (hereinafter, referred to simply as the engine). The engine 1 includes an exhaust pipe 2 that discharges gas emissions to the outside, and a muffler 3 is connected to a distal end of the exhaust pipe 2. The engine 1 has its speed and its torque controlled by an engine control unit 4. As is well known, the engine control unit 4 receives an input signal indicating a target engine speed specified using an engine control knob, and then on the basis of the target engine speed and an actual engine speed detected by an engine speed detection sensor, controls an electronic governor equipped on the engine 1, and controls a fuel injection rate. The speed and torque of the engine 1 are thus controlled.

The engine control unit 4 is connected to a vehicle body control unit 21, an information storage unit 22, and a monitor control unit 23, via a communication line 25, thus constituting a vehicle body network.

The vehicle body control unit 21 receives input signals from sensors provided in a hydraulic system (described later) and on the vehicle body, and conducts arithmetic processing for hydraulic control and vehicle body control.

The monitor control unit 23 receives detection signals from various sensors not shown, such as a residual fuel amount sensor and water temperature sensor that the engine control unit 4 and the vehicle body control unit 21 have, via the communication line 25. The monitor control unit 23 also undertakes display control to display detection results at a display monitor 16. The monitor control unit 23 further controls data entry that uses an operating section 17 of the display monitor 16.

The information storage unit 22 collects various input signals as operational data from the engine control unit 4, the vehicle body control unit 21, the monitor control unit 23, and the like, via the communication line 25, and stores the data into a database chronologically. Also, the data is periodically transmitted to a management server using a satellite communication terminal not shown.

The exhaust gas purification system of the present embodiment, provided in the hydraulic excavator including the above-described units and devices, includes a diesel particulate filter (DPF) unit 11 disposed in the exhaust pipe 2 that forms part of an exhaust system of the engine 1. The filter unit 11 traps particulate matter (PM) contained in gas emissions. The exhaust gas purification system also includes a differential pressure sensor 12 that detects a difference in pressure between an upstream side and downstream side of the filter unit 11, that is, a pressure drop in the filter unit 11. In addition, the exhaust gas purification system includes a work pause switch 13 (first operating unit) operated by an operator to notify that the hydraulic excavator has entered a work pause state. Furthermore, the exhaust gas purification system includes a pressure sensor 14 for detecting whether control pilot pressures of remote control valves (described later) are present, the sensor 14 also being used to detect active and inactive states of operating elements pertaining to engineering work. Moreover, the exhaust gas purification system includes a solenoid control valve 15 for imparting a hydraulic load to the engine 1 during regeneration control. Besides, the exhaust gas purification system includes the operating section 17 of the display monitor 16 that functions as a second operating unit for the operator to enter a work pause time. Additionally, the exhaust gas purification system includes the vehicle body control unit 21, the monitor control unit 23, and the engine control unit 4. The filter unit 11 contains a filter formed to trap the PM contained in the gas emissions, and an oxidation catalyst disposed at an upstream side of the filter.

The engine control unit 4 receives a detection signal as an input signal from the differential pressure sensor 12, and transmits the detection signal to the vehicle body control unit 21 via the communication line 25. When the operating section 17 is operated as the operating unit for entry of the work pause time, the monitor control unit 23 receives the entered work pause time and then transmits the received work pause time to the vehicle body control unit 21 via the communication line 25.

Upon receiving the work pause time from the monitor control unit 23 via the communication line 25, the vehicle body control unit 21 stores the received work pause time into a storage unit such as a hard disk, and sets the stored work pause time as a regeneration control time. In addition, the vehicle body control unit 21 receives the detection signal of the differential pressure sensor 12, transmitted from the engine control unit 4. The vehicle body control unit 21 further receives an operating signal created by the work pause switch 13, and a detection signal created by the pressure sensor 14. The vehicle body control unit 21 uses the received signals to conduct predetermined arithmetic processing, output a regeneration starting instruction signal and a regeneration stopping instruction signal to the engine control unit 4 via the communication line 25, and output an ON control signal to the solenoid control valve 15.

The engine control unit 4 has a regeneration controller 4a that functions as a regenerating device. The engine control unit 4, upon receiving the regeneration starting instruction signal from the vehicle body control unit 21, activates the regeneration controller 4a, and upon receiving the regeneration stopping instruction signal from the vehicle body control unit 21, deactivates the regeneration controller 4a. The regeneration controller 4a conducts regeneration control by controlling the electronic governor of the engine 1. After the vehicle body control unit 21 has output the ON control signal to the solenoid control valve 15 to provide engine 1 loading (described later), as is well known (for example, in JP,A 2005-120895), the regeneration controller 4a maintains the engine speed at a predetermined speed (say, 1,750 rpm) and oxidizes unburnt HC (hydrocarbons) by post-injection (additional fuel injection) in an expansion stroke of the engine after main fuel injection. The oxidation of the HC then raises a temperature of the gas emissions. The heated emissions activate the oxidation catalyst of the filter unit 11, thereby burning off the PM deposited on the filter.

Also, the exhaust gas purification system has a manual regeneration starting switch 18, and the vehicle body control unit 21 receives an operating signal of the manual regeneration starting switch 18 and after conducting a predetermined arithmetic process, outputs a regeneration starting signal and a regeneration stopping signal to the engine control unit 4 via the communication line 25. The vehicle body control unit 21 further outputs a control signal to the solenoid control valve 15. In this case, the engine control unit 4 also activates the regeneration controller 4a upon receiving the regeneration starting signal, and deactivates the regeneration controller 4a upon receiving the regeneration stopping signal.

In this specification, the regeneration control based upon the operating signal of the work pause switch 13 is referred to as work pause time-based regeneration control, and the regeneration control based upon the operating signal of the manual regeneration starting switch 18 is referred to as manual regeneration control. Where necessary, operation of the regeneration controller 4a (regenerating device) is also referred to as regeneration control.

Figure 2:
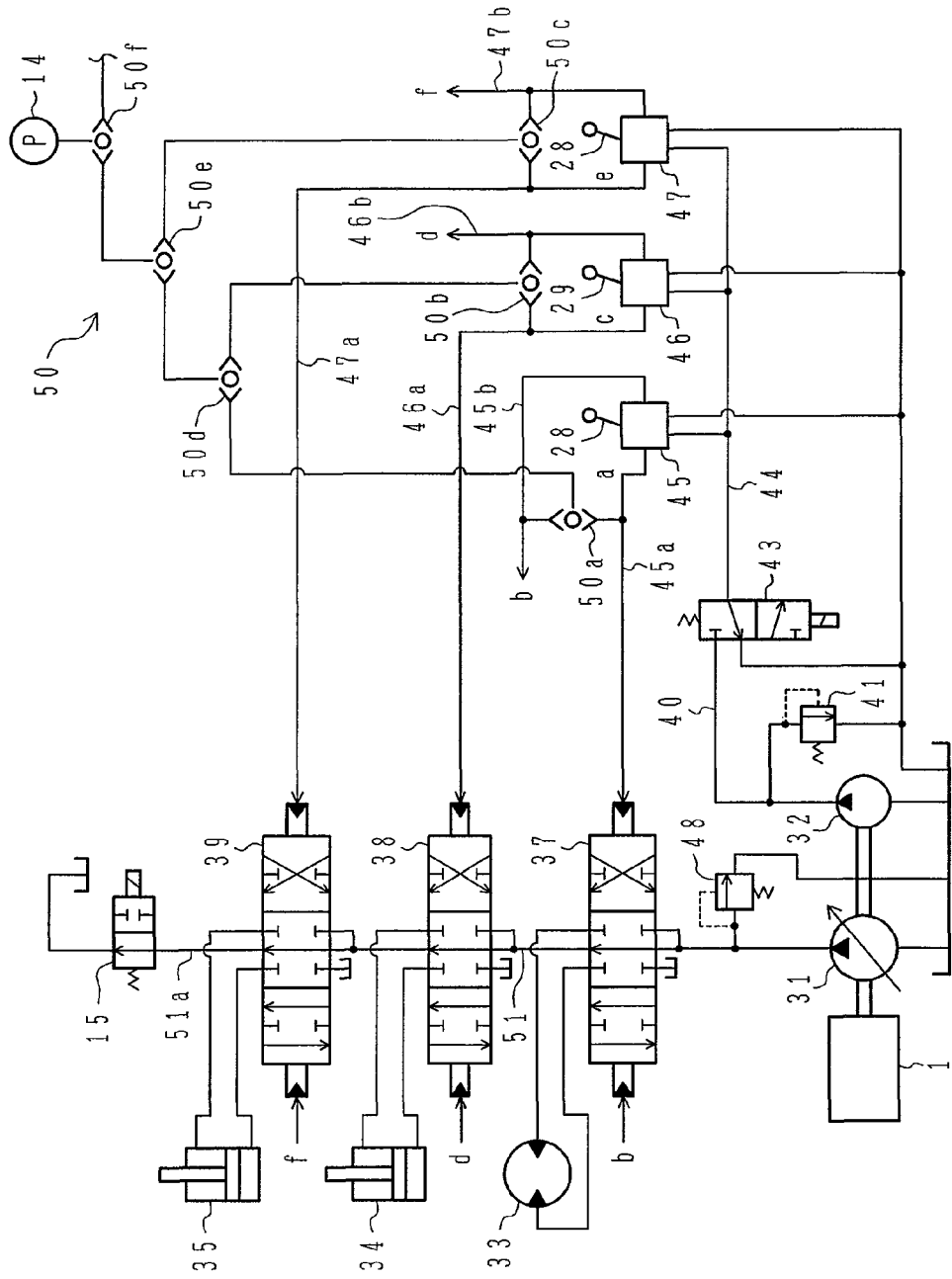
FIG. 2 is a diagram showing a hydraulic circuit system mounted in the hydraulic excavator, the engineering machine according to the present embodiment.

Hydraulic System:

FIG. 2 is a diagram showing a hydraulic circuit system mounted in the hydraulic excavator, the engineering machine according to the present embodiment. The hydraulic circuit system of the hydraulic excavator includes a variable-displacement type of main hydraulic pump 31 and a fixed-displacement type of pilot pump 32, both driven by the engine 1. The hydraulic circuit system also has a plurality of hydraulic actuators including a hydraulic motor 33 and hydraulic cylinders 34, 35 driven by a hydraulic fluid delivered from the hydraulic pump 31, and a plurality of flow control valves including pilot-operated flow control valves 37 to 39 each for controlling a flow (flow rate and direction) of the hydraulic fluid supplied from the hydraulic pump 31 to the hydraulic motor 33 and the hydraulic cylinders 34, 35. In addition to a pilot relief valve 41 adapted to maintain at a constant level a pressure of the hydraulic fluid delivered from the pilot pump 32 and form a pilot hydraulic fluid source 40, the hydraulic circuit system further has a solenoid control valve 43 connected to a downstream side of the pilot hydraulic fluid source 40, the solenoid control valve 43 being ON/OFF controlled according to an open/closed state of a gate lock lever provided at an entrance side of a cabin of the hydraulic excavator. Moreover, the hydraulic circuit system has remote control valves 45, 46, and 47 connected to a pilot hydraulic line 44 at a downstream side of the solenoid control valve 43 and used to generate control pilot pressures "a" to "f" for operating the flow control valves 37 to 39 with an hydraulic pressure of the pilot hydraulic fluid source 40 as a main pressure. Besides, the hydraulic circuit system has a main relief valve 48 that functions as a safety device to define a maximum allowable delivery pressure of the main hydraulic pump 31. The remote control valves 45, 46, and 47 are contained in left and right control levers positioned to the left and right of an operator's seat within the cabin.

Primary ports of the remote control valves 45, 46, and 47 are connected to the pilot hydraulic line 44, secondary ports are connected to pilot lines 45a/45b, 46a/46b, and 47a/47b, and the control pilot pressures "a" to "f", after being generated by the remote control valves 45, 46, and 47, are guided to pressure-receiving sections of the flow control valves 37 to 39 through the pilot lines. The pilot lines 45a/45b, 46a/46b, and 47a/47b have a shuttle valve group 50 connected to each. The shuttle valve group 50 includes shuttle valves 50a to 50f, with the shuttle valve 50a being connected between the pilot lines 45a and 45b of the remote control valve 45, the shuttle valve 50b being connected between the pilot lines 46a and 46b of the remote control valve 46, the shuttle valve 50c being connected between the pilot lines 47a and 47b of the remote control valve 47, the shuttle valve 50d being connected between output ports of the shuttle valves 50a and 50b, the shuttle valve 50e being connected between output ports of the shuttle valves 50c and 50d, and the shuttle valve 50f being connected between an output port of the shuttle valve 50e and an output port of a final-stage shuttle valve pertaining to a remote control valve of any other operating element (not shown). Thus, the shuttle valve group 50 including the shuttle valves 50a to 50f extracts a maximum pressure of all control pilot pressures, which include the control pilot pressures "a" to "f" of the remote control valves 45 to 47 and the control pilot pressures of the remote control valves of other operating elements not shown. The final-stage shuttle valve 50f in the shuttle valve group 50 outputs the maximum pressure. The pressure sensor 14, connected to an output port of the final-stage shuttle valve 50f, detects the maximum pressure that is an output pressure of the shuttle valve 50f. The pressure sensor 14 thereby detects the control pilot pressures of all remote control valves including the remote control valves 45 to 47, that is, the active/inactive states of the work-associated operating elements including the control levers of the remote control valves 45 to 47.

The plurality of flow control valves including the flow control valves 37 to 39 are center-bypass valves, which are each connected in series to a center-bypass line 51 that connects to the delivery hydraulic line of the hydraulic pump 31, the center-bypass line 51 being connected at its downstream extreme end 51a to a tank T. Also, the solenoid control valve 15 is connected to the downstream extreme end 51a of the center-bypass line 51. The solenoid control valve 15 is a two-position control valve having an open position and a closed position. When the ON control signal from the vehicle body control unit 21 is absent and the solenoid control valve 15 does not have its solenoid energized, the control valve 15 is placed in the open position, and when the ON control signal is output from the vehicle body control unit 21 and the solenoid is energized, the control valve 15 is switched from the open position shown in the figure, to the closed position.

As will be further detailed later herein, the solenoid control valve 15 is switched to the closed position when the engine control unit 4 activates the regenerating device (regeneration controller 4a). When the solenoid control valve 15 is switched to the closed position, the delivery pressure of the hydraulic pump 31 will increase to a pressure setting of the main relief valve 48. Consequently, the engine 1 that drives the hydraulic pump 31 will also increase in load torque. This will allow the exhaust gas temperature of the engine 1 to be increased along with the activation of the regenerating device (regeneration control).

Figure 3:
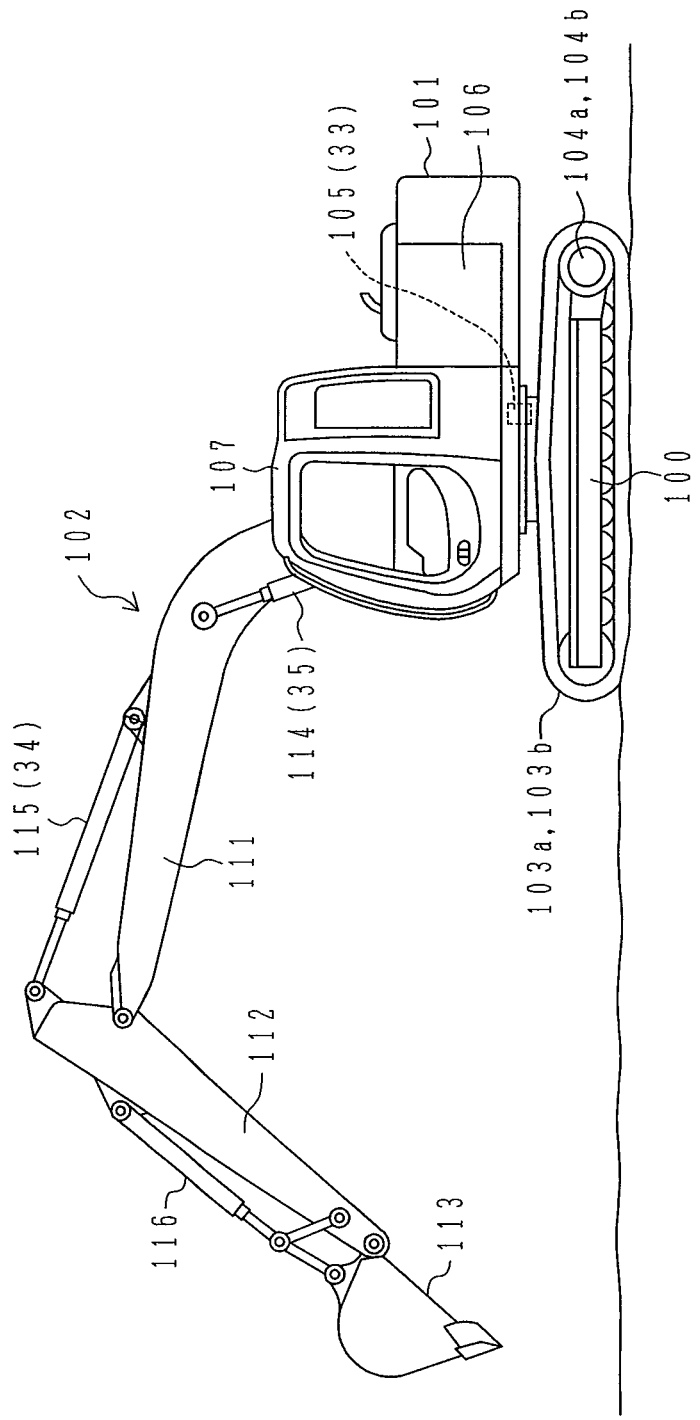
FIG. 3 is an external view of the hydraulic excavator including the hydraulic circuit system shown in FIG. 2.

Hydraulic Excavator:

FIG. 3 is an external view of the hydraulic excavator, an example of an engineering machine equipped with the hydraulic circuit system shown in FIG. 2. The hydraulic excavator includes a lower travel structure 100, an upper swing structure 101, and a front work device 102. The lower travel structure 100 has left and right crawler-driven travel devices 103a, 103b, and is driven by left and right traveling motors 104a, 104b. The upper swing structure 101 is mounted on the lower travel structure 100 so as to be swingable by a swing motor 105. The front work device 102 is installed on a forepart of the upper swing structure 101 so as to be vertically inclinable. The upper swing structure 101 includes an engine room 106 and the cabin 107. The engine 1 is disposed in the engine room 106, the gate lock lever is provided at an entrance side of the operator's seat inside the cabin 107, and the control levers containing the remote control valves 35, 36, and 37 are arranged across the operator's seat. Also, the engine control knob and the display monitor 16 are appropriately positioned in the cabin 107.

The front work device 102 is a multi-articulated structure with a boom 111, an arm 112, and a bucket 113. The boom 111 is turned vertically by extension/contraction of a boom cylinder 114, the arm 112 is turned vertically and/or longitudinally by extension/contraction of an arm cylinder 115, and the bucket 113 is turned vertically and/or longitudinally by extension/contraction of a bucket cylinder 116.

Referring back to FIG. 2, the hydraulic motor 33 is, for example, the swing motor 105, the hydraulic cylinder 34 is, for example, the arm cylinder 115, and the hydraulic cylinder 35 is, for example, the boom cylinder 114. Other hydraulic actuators equivalent to the traveling motors 104a, 104b, the bucket cylinder 116, and the like, are also actually included in the hydraulic circuit system of FIG. 2, but these actuators are omitted therefrom. This also applies to other control valves.

Figure 4:
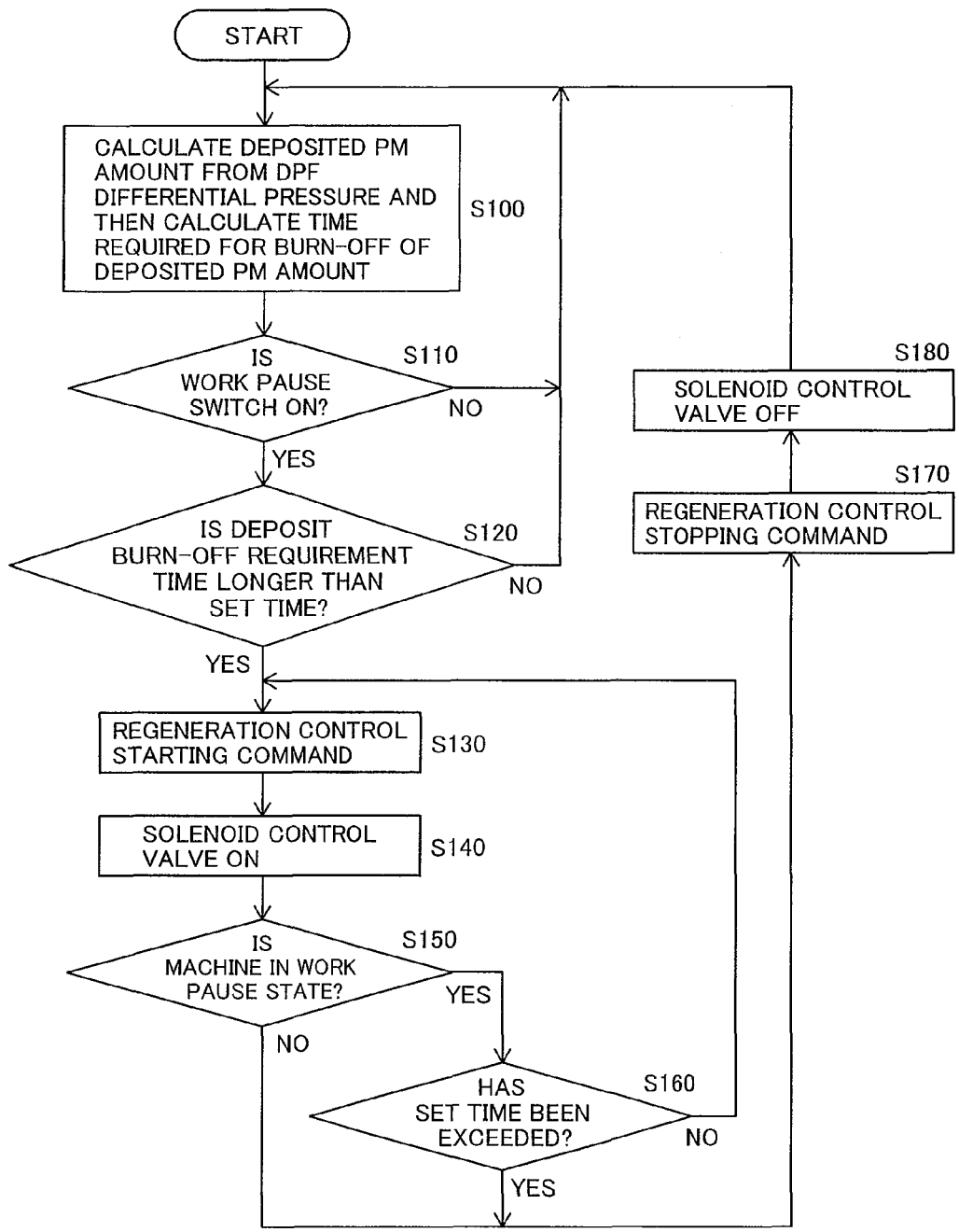
FIG. 4 is a flowchart that shows process details of work pause time-based regeneration control with a vehicle body control unit.

Process Details of the Work Pause Time-Based Regeneration Control with the Vehicle Body Control Unit 21:

FIG. 4 is a flowchart that shows process details of the work pause time-based regeneration control with the vehicle body control unit 21. The vehicle body control unit 21 executes the arithmetic process shown in FIG. 4, in a predetermined control cycle.

Firstly, the vehicle body control unit 21 receives the detection signal of the differential pressure sensor 12, transmitted from the engine control unit 4, then calculates a current deposition level of the particulate matter deposited on the filter of the filter unit 11, from the differential pressure detected across the filter unit 11 by the differential pressure sensor 12, and further calculates from the above-calculated deposition level a time required for the regenerating device to burn off the deposited PM. Hereinafter, the thus-calculated deposition level is referred to as the deposited PM amount, the differential pressure as the DPF differential pressure, and the necessary burn-off time as the regenerating requirement time. The successive operations described above are conducted in step S100.

Figure 5:
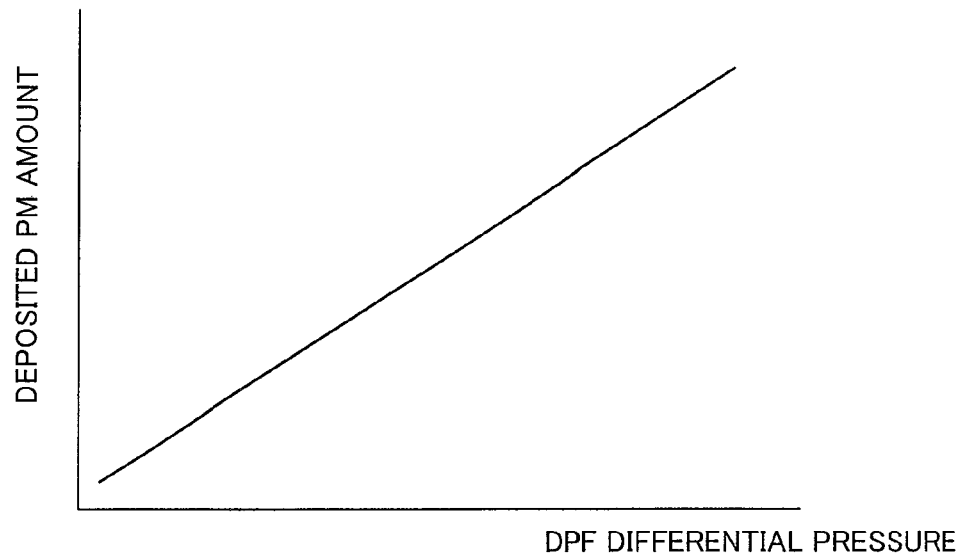
FIG. 5 is a diagram representing a relationship between a DPF differential pressure and a deposited PM amount.

The calculation of the deposited PM amount is conducted by storing into a memory table such a relationship of the DPF differential pressure and deposited PM amount as shown in FIG. 5, then checking the DPF differential pressure, detected by the differential pressure sensor 12, against the memory table, and deriving the deposited PM amount corresponding to the DPF differential pressure. As shown in FIG. 5, the relationship that the deposited PM amount increases with increases in the DPF differential pressure is set in the memory table. This relationship between the deposited PM amount and the DPF differential pressure is derived by experimentation or the like beforehand.

Figure 6:
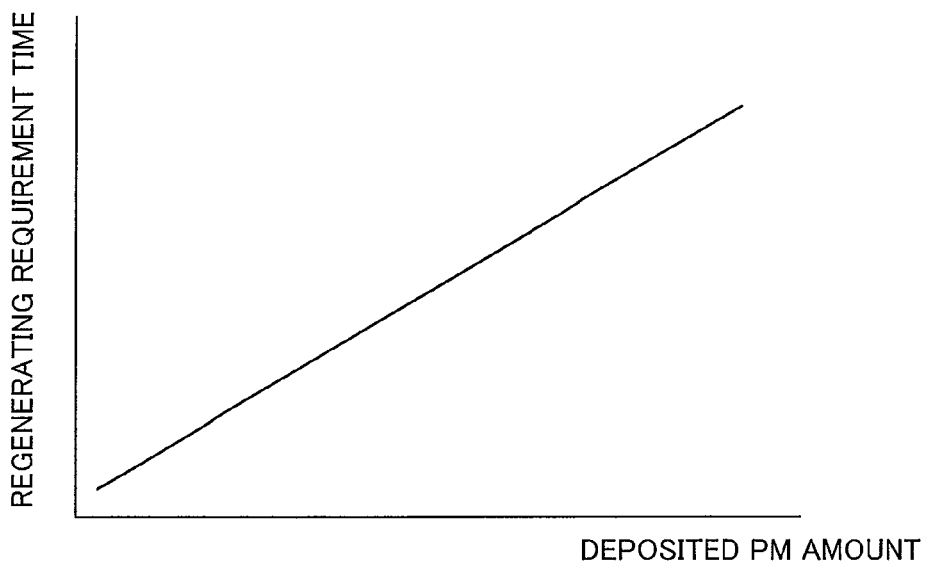
FIG. 6 is a diagram representing a relationship between the deposited PM amount and a regenerating requirement time.

The calculation of the regenerating requirement time is conducted by storing into the memory table such a relationship of the deposited PM amount and regenerating requirement time as shown in FIG. 6, then checking the calculated PM deposition level against the memory table, and deriving the appropriate regenerating requirement time. As shown in FIG. 6, the relationship that the regenerating requirement time increases with increases in the deposited PM amount is set in the memory table. This relationship between the deposited PM amount and the regenerating requirement time is derived by experimentation or the like beforehand.

After the above, whether the work pause switch 13 has been operated, that is, whether the switch 13 has turned on, is judged from the operating signal level of the work pause switch 13 (step S110). This judgment is further followed by a judgment as to whether the regenerating requirement time that was calculated in step S100 is in excess of the work pause time entered and set using the operating section 17 of the monitor control unit 23 (step S120). If the state of the work pause switch 13 is ON and the regenerating requirement time is in excess of the set work pause time, the regeneration control starting signal is output to the engine control unit 4 (step S130). In addition, the control ON signal is output to the solenoid control valve 15 to switch this valve to the closed position (step S140). This starts the regeneration control with the engine 1 loaded in a hydraulic fashion.

If the state of the work pause switch 13 in step S110 is not ON or if the regenerating requirement time in step S120 is not in excess of the set work pause time, process control is returned to step S100 to repeat process steps S100 and S110.

After the start of the regeneration control by execution of process steps S130 and S140, whether the work pause state is continued is judged (step S150) and whether an elapsed time from the activation (ON state) of the work pause switch 13 has exceeded the set work pause time is judged (step S160). The judgment as to whether the work pause state is continued is conducted by control pilot pressure detection of all remote control valves including the remote control valves 45 to 47, the detection being based upon the detection signal from the pressure sensor 14. In other words, if no control pilot pressure is detected, the work pause state is judged to be continued, or if a control pilot pressure is detected, the work is judged to have been started. If the work pause state is continued and the elapsed time from the activation of the work pause switch 13 is not in excess of the set time, process control is returned to step S130 to repeat process steps S130 to S160.

If it is judged in step S150 that the work has been started, or if it is judged in step S160 that the elapsed time from the activation of the work pause switch 13 has exceeded the set work pause time, the regeneration control stopping signal is output to the engine control unit 4 (step S170). In addition, the control signal to be output to the solenoid control valve 15 is turned off to switch this valve to the open position (step S180). This releases the hydraulic load of the engine 1 and stops the regeneration control.

Figure 7:
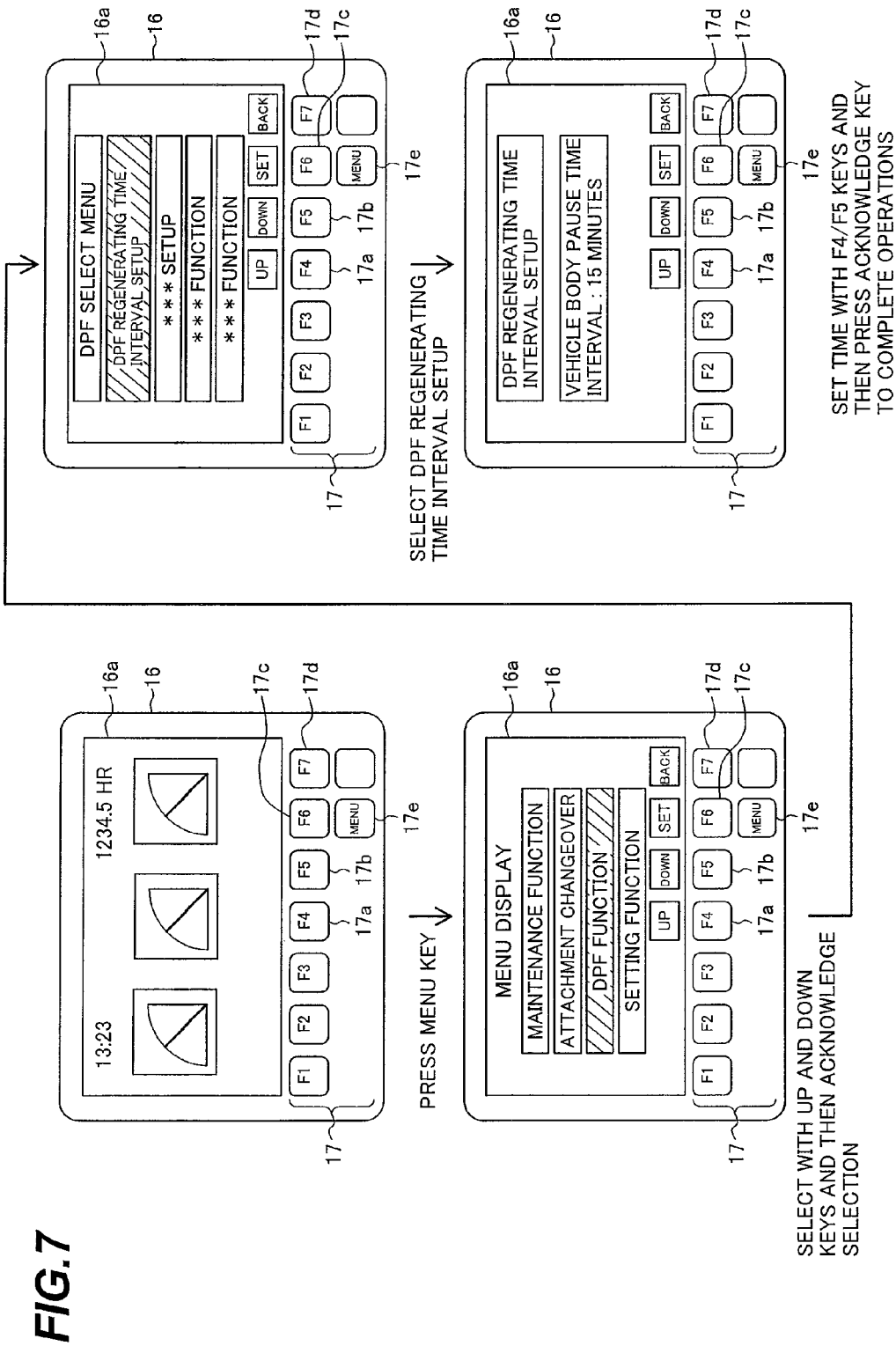
FIG. 7 is a diagram showing a configuration of an operating section of a display monitor and an entry procedure relating to a work pause time.

Entry of the Work Pause Time:

FIG. 7 is a diagram showing a configuration of the operating section 17 of the display monitor 16 and an entry procedure relating to the work pause time.

The display monitor 16 has a display panel 16a of a liquid crystal type or the like, and the operating section 17 is made up of a switch group disposed at a lower side of the display panel 16a, the switch group including F4 to F7 switches 17a to 17d and a menu switch 17e.

A hydraulic working fluid temperature, an in-radiator coolant temperature, an engine fuel level, and other data measurements are normally displayed on the display panel 16a of the display monitor 16. A press of the menu switch 17e under this state changes the display to a menu. Items that can be selected from the menu include a "DPF function". In this menu mode, the F4 switch 17a and the F5 switch 17b function as vertical cursor control keys to move vertically a cursor (shaded section in FIG. 7) that is displayed in the menu mode. Likewise, the F6 switch 17c functions as an acknowledge key, and the F7 switch 17d as a return key. For entry of the work pause time, the operator selects the "DPF function" by operating the F4 switch 17a and the F5 switch 17b, namely, the vertical cursor control keys, and then presses the F6 switch 17c, namely the acknowledge key, to acknowledge the selection. The press of the acknowledge key 17c changes the display to a DPF select menu. Items that can be selected from the DPF select menu include "DPF regenerating time interval setup". In this menu mode, the operator selects "DPF regenerating time interval setup" by operating the F4 switch 17a and the F5 switch 17b, namely, the vertical cursor control keys, and then presses the F6 switch 17c, or the acknowledge key, to acknowledge the selection. The press of the acknowledge key 17c changes the display mode to DPF regenerating time interval setup. A region for entering data in "Vehicle body pause time interval" is displayed in the DPF regenerating time interval setup mode. In this setup mode, the F4 switch 17a and the F5 switch 17b function as a data-incrementing key and a data-decrementing key, respectively. The operator enters a value in the "Vehicle body pause time interval" display region by operating the incrementing and decrementing keys 17a, 17b, and then presses the F6 switch 17c, or the acknowledge key, to acknowledge the entry. The press of the acknowledge key 17c causes the entered value to be transmitted as a work pause time setup signal from the monitor control unit 23 through the communication line 25 to the vehicle body control unit 21, in which the value is then set.

Figure 8:
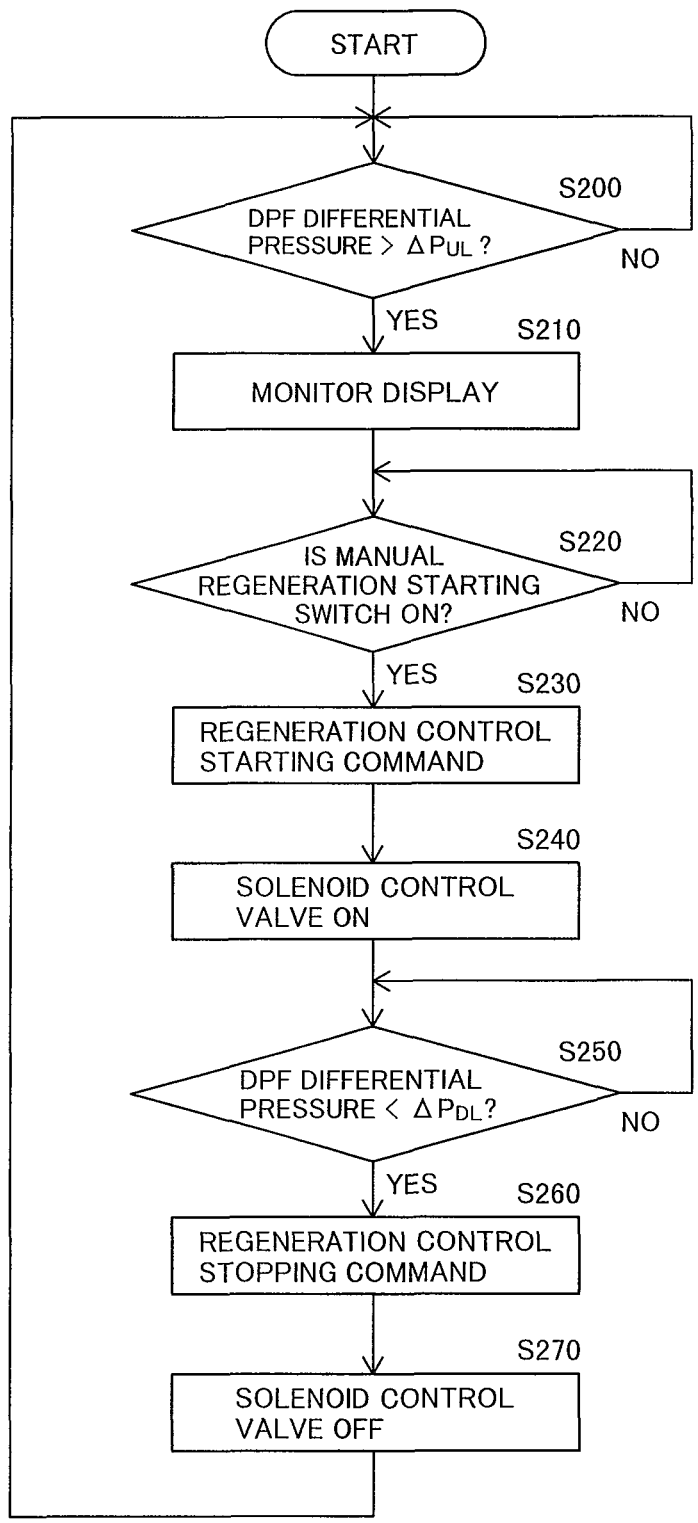
FIG. 8 is a flowchart that shows process details of manual regeneration control with the vehicle body control unit.

Process Details of the Manual Regeneration Control with the Vehicle Body Control Unit 21:

FIG. 8 is a flowchart that shows process details of the manual regeneration control with the vehicle body control unit 21. The vehicle body control unit 21 executes the arithmetic process shown in FIG. 8, in a predetermined control cycle.

Firstly, in step S200, the vehicle body control unit 21 receives as an input signal the detection signal of the differential pressure sensor 12, transmitted from the engine control unit 4, and judges whether the differential pressure across the filter unit 11, detected by the differential pressure sensor 12, is greater than a preset regeneration-starting threshold level ΔPUL. If judgment results are YES, a warning that prompts the operator to start the manual regeneration control is displayed on the display monitor 16 (step S210). Process step S200 is repeated if the judgment results are NO. The regeneration-starting threshold level ΔPUL here is a limit value for preventing thermal damage to the filter of the filter unit 11.

After the execution of step S210 to display the warning that prompts the operator to start the manual regeneration control on the display monitor 16, a judgment as to whether the manual regeneration starting switch 18 has been operated (i.e., turned on) is conducted in step S220. If judgment results are NO, the process is repeated. If the judgment results are YES, the regeneration control starting signal is output to the engine control unit 4 (step S230) and then the control ON signal is output to the solenoid control valve 15 to switch this valve to the closed position (step S240). This starts the regeneration control of the engine control unit 4 with the engine 1 loaded in a hydraulic fashion.

Next, it is judged in step S250 whether the differential pressure across the filter unit 11, detected by the differential pressure sensor 12, is smaller than a preset regeneration-ending threshold level ΔPDL. If judgment results are NO, the process is repeated. If the judgment results are YES, the regeneration control stopping signal is output to the engine control unit 4 (step S260) and then the control signal to be output to the solenoid control valve 15 is turned off to switch this valve to the open position (step S270). This releases the hydraulic load of the engine 1 and stops the regeneration control of the engine control unit 4.

Association with the Scope of the Present Patent:

In the above, when the operating section 17 of the display monitor 16 functions as an operating unit for entering the work pause time, the operating section 17 constitutes a setting element that presets the work pause time for the engineering machine (hydraulic excavator). Likewise, the work pause switch 13 constitutes an element for notifying that the engineering machine (hydraulic excavator) has entered the work pause state. Also, the processing function of the vehicle body control unit 21 that is shown in FIG. 4 constitutes a regeneration control element that operates the regenerating device (regeneration controller 4a) for the preset work pause time upon receiving the notice of the fact that the engineering machine has entered the work pause state.

Also, in the present embodiment, the vehicle body control unit 21 (regeneration control element) having the processing function shown in FIG. 4 calculates the time required for the regenerating device to burn off the current amount of particulate matter deposited on the filter, and activates the regenerating device when notified that the engineering machine has entered the work pause state, and when the calculated time is longer than the preset work pause time.

Operation:

Next, operation of the present embodiment is described below.

For hydraulic excavators, such a non-working time (work pause time) as associated with a dump truck queue always occurs during excavation, dump truck loading, or other work that involves loading excavated sediments onto the load-carrying platform of a dump truck. During such a time, since the work is in pause, the engine load is light and the exhaust gas temperature of the engine is relatively low. Consequently, a natural combustion effect against the PM deposited on the filter will decrease and the filter will easily become clogged with PM.

In the present embodiment, regeneration control takes place as follows using such a work pause time:

The waiting time for dump trucks depends upon the work site. Before the operator starts the work at a new site, therefore, he or she first estimates the dump truck waiting time appropriate for the work site, and then determines and sets the work pause time usable for the regeneration control of the present invention, from the estimated dump truck waiting time. As described above, this setting operation is performed using the operating section 17 shown in FIG. 7.

The operator next starts the actual work. More specifically, after filling the loading platform of the dump truck with excavated sediments and then waiting for a next empty dump truck, the operator presses the work pause switch 13. The press of the work pause switch 13 makes the vehicle body control unit 21 receive the operating signal of the work pause switch 13. If the regenerating requirement time that is the time required for the regenerating device to burn off the current amount of PM deposited on the filter of the filter unit 11 is in excess of the set work pause time, the vehicle body control unit 21 outputs the regeneration control starting signal to the engine control unit 4 (the process advances to steps S110, S120, and S130 of FIG. 4, in that order). The vehicle body control unit 21 also outputs the appropriate control signal to the solenoid control valve 15 (step S140 in FIG. 4). This starts the filter regeneration control (filter-deposited PM burn-off) that uses the work pause time of the hydraulic excavator. Conversely, if, after the press of the work pause switch 13, the regenerating requirement time is not in excess of the set work pause time, the regeneration control is not started (process control is returned from step S120 to step S100 of FIG. 4). After the start of the regeneration control, when the set work pause time elapses, the regeneration control terminates (steps S160, S170, and S180 are executed in that order).

After the start of the regeneration control, if the next dump truck arrives earlier than a scheduled time and the work is to be restarted earlier than expiry of the set work pause time, the operator can operate the control levers (remote control valves) to bring the regeneration control to an automatic stop (the process advances to steps S150, S170, and S180, in that order) and restart the work.

Meanwhile, during the work by the hydraulic excavator, the engine control unit 4 also having an automatic regeneration control function not shown in the figure conducts automatic regeneration control to burn the PM deposited on the filter. During the automatic regeneration control, the engine control unit 4 uses the pressure sensor 14, for example, to detect the differential pressure across the filter unit 11 and discriminate the amount of PM deposited on the filter. If the deposited PM amount exceeds a threshold level, the engine control unit 4 further conducts post-injection (additional fuel injection) in the expansion stroke of the engine after main fuel injection, thereby increasing the temperature of the gas emissions automatically and burning the PM deposited on the filter.

If, despite the work pause time-based regeneration control and automatic regeneration control described above, the amount of PM deposited on the filter increases and the differential pressure across the filter unit 11 exceeds the regeneration-starting threshold level $\Delta$PUL associated with the manual regeneration control, a warning is displayed on the display monitor 16 (the process advances to step S200 first and then step S210). After the warning has been displayed on the display monitor 16, the operator stops the work and turns on the regeneration starting switch 18. Thus, the regeneration control is conducted with a hydraulic load applied to the engine 1 (the process advances to steps S220 to S240 of FIG. 8). After this, when the differential pressure across the filter unit 11 decreases below the regeneration-ending threshold level $\Delta$PDL, the manual regeneration control terminates (the process advances to steps S250, S260, and S270, in that order).

Effects:

As described above, the present embodiment yields the following effects.

The hydraulic excavator is a machine that stops the vehicle body before conducting work. The machine conducts the work by driving the hydraulic pump 31 with the engine 1 and then driving the actuators, such as the boom cylinder 114 and the arm cylinder 115, with the oil delivered from the hydraulic pump 31. As described above, the work must be stopped when manual regeneration control is conducted with such a hydraulic excavator. The regeneration-starting threshold level $\Delta$PUL during the manual regeneration control is a limit value for preventing thermal damage to the filter of the filter unit 11, and the manual regeneration control time required is relatively long. As a result, once the manual regeneration control has been started, working efficiency decreases significantly since no work is executable during that time.

In the present embodiment, as described above, the characteristic work pause time of such an engineering machine as a hydraulic excavator, is used to conduct the regeneration control and burn the PM deposited on the filter of the filter unit 11. The work pause time of the engineering machine such as the hydraulic excavator is also a time during which, since the engine load is light, the natural combustion effect against the PM deposited on the filter tends to decrease and the filter easily becomes clogged with PM. Conducting the regeneration control during such a time to burn the PM deposited on the filter allows the deposited PM amount to be reduced efficiently. Reducing the deposit of particulate matter on the filter by burning the deposit during the work pause time in this way suppresses any increases in the amount of PM later deposited on the filter, thus lowers a rate at which the manual regeneration control is to be requested, and avoids a decrease in working efficiency due to forced or accelerated manual regeneration control during the work.

When the amount of PM deposited on the filter of the filter unit 11 is not too large, if the regeneration control is executed to operate the regenerating device during the work pause time, fuel efficiency is likely to deteriorate since the regenerating device will correspondingly increase in operating frequency. In the present embodiment, even when the work pause switch 13 is pressed, unless the regenerating requirement time is not in excess of the set work pause time, the deterioration of fuel efficiency due to frequent operation of the regenerating device can be avoided since the regeneration control is not started.

Additionally, even after the regeneration control has been started, if the next dump truck arrives earlier than the expiry of the set work pause time, operations on the appropriate control levers (remote control valves) will stop the regeneration control automatically, thus allowing the operator to freely start the work without paying attention to a state of the regeneration control.

Second Embodiment

Figure 9:
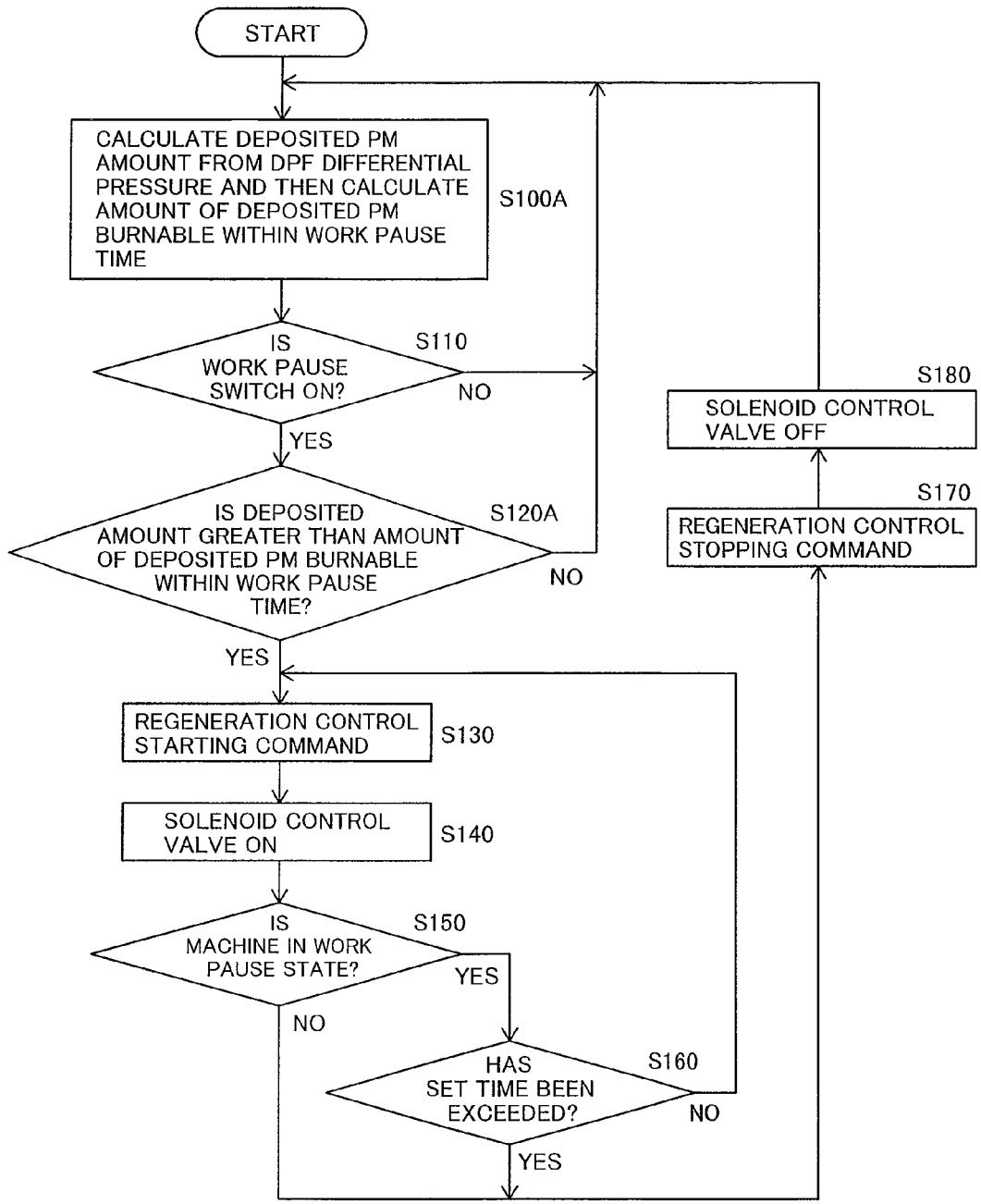
FIG. 9 is a flowchart that shows process details of the vehicle body control unit in a second embodiment of the present invention.

A second embodiment of the present invention is described below using FIG. 9. FIG. 9 is a flowchart that shows process details of the vehicle body control unit 21 in the present embodiment, with the same reference numbers assigned to the same steps as those shown in FIG. 4. The present embodiment differs from the embodiment of FIG. 4 in that steps S100A and S120A are provided, instead of steps S100 and S120, to conduct deposition comparisons on different bases before activating the regenerating device.

More specifically, in step S100A of the process in the present embodiment, the current amount of particulate matter deposited on the filter of the filter unit 11 (hereinafter, the current amount of PM is referred to simply as the deposited PM amount) is calculated from the differential pressure detected across the filter unit 11 by the differential pressure sensor 12 (likewise, this differential pressure is hereinafter referred to simply as the DPF differential pressure). The amount of deposited PM burnable within the set work pause time is also calculated in step S100A. This calculation can be easily conducted using a reciprocal function of a relationship between the deposited PM amount and the regenerating requirement time, the relationship being shown in FIG. 6. Instead of the judgment as to whether the regenerating requirement time is in excess of the set work pause time, a judgment of whether the current deposited PM amount that was calculated in step S100A is in excess of the burnable deposited PM amount within the set work pause time that was also calculated in step S100A takes place in step S120A. If this judgment produces affirmative results, the regeneration control starting signal is output to the engine control unit 4 (step S130) and then the control ON signal is output to the solenoid control valve 15 to switch this valve to the closed position (step S140), whereby the engine control unit 4 starts the regeneration control with a hydraulic load applied to the engine 1.

Substantially the same effects as in the first embodiment can also be obtained in the present embodiment thus constructed.

Third Embodiment

Figure 10:
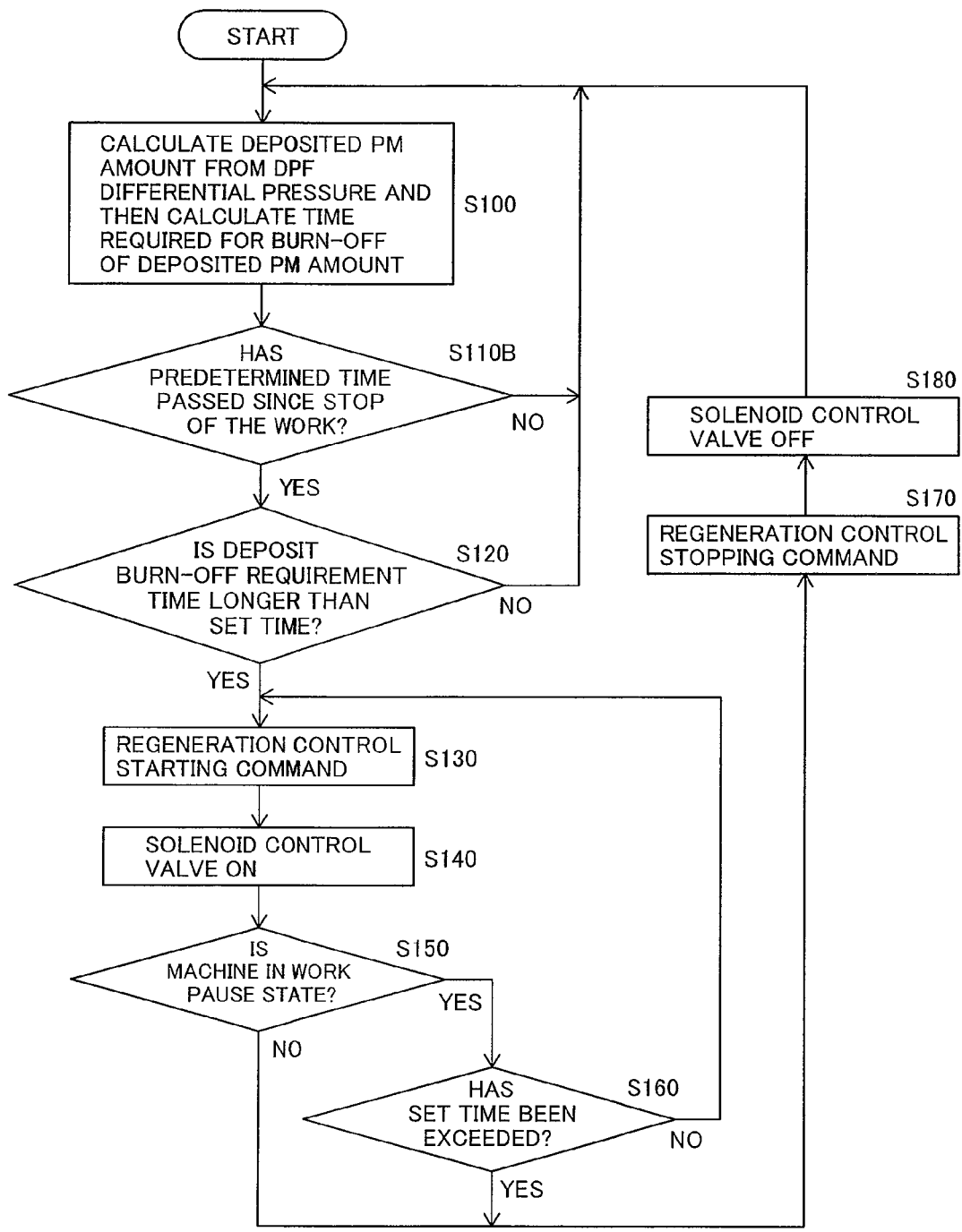
FIG. 10 is a flowchart that shows process details of the vehicle body control unit in a third embodiment of the present invention.

A third embodiment of the present invention is described below using FIG. 10. FIG. 10 is a flowchart that shows process details of the vehicle body control unit 21 in the present embodiment, with the same reference numbers assigned to the same steps as those shown in FIG. 4. The present embodiment differs from the embodiment of FIG. 4 in that step S110B is provided, instead of step S110, to use the detection value of the pressure sensor 14 in order to notify that the engineering machine has entered the work pause state.

That is to say, in the present embodiment, the work pause switch 13 is not provided and in step S110B of FIG. 10, it is first judged whether a predetermined time (say, one minute) has passed since the stop of the work, and then if the predetermined time has passed, the engineering machine is judged to have entered the work pause state. A judgment of whether the work has come to a stop is conducted by receiving the detection signal from the pressure sensor 14 and detecting the presence/absence of a control pilot pressure(s) of all remote control valves including the remote control valves 45 to 47, that is, detecting the active/inactive states of the control levers. Briefly, if no control pilot pressure is detected, the work is judged to have been stopped, and the time that has passed since the stop is counted.

In the present embodiment thus constructed, the fact that the hydraulic excavator has entered the work pause state can also be notified and substantially the same effects as those of the first embodiment can be obtained. In addition, the present embodiment improves operator convenience since, even if the operator does not operate the work pause switch each time he or she waits for a dump truck, the regeneration control using the work pause time can be started automatically.

Fourth Embodiment

A fourth embodiment of the present invention is described below using FIGS. 1 and 11. In the present embodiment, the work pause time during the regeneration control is not entered or set by the operator. Instead, the work pause time is automatically calculated and set using operational data stored within the information storage unit.

As set forth in the description of the first embodiment, the information storage unit 22 in FIG. 1 collects various input signals as operational data from the engine control unit 4, the vehicle body control unit 21, the monitor control unit 23, and the like, via the communication line 25, and stores the data into a database chronologically. The operational data collected will include the detection data of the pressure sensor 14 that is input to the vehicle body control unit 21.

The vehicle body control unit 21 calculates and sets the work pause time of the regeneration control using the operational data stored in the information storage unit 22. FIG. 11 is a flowchart that shows related process details of the vehicle body control unit 21.

Figure 11:
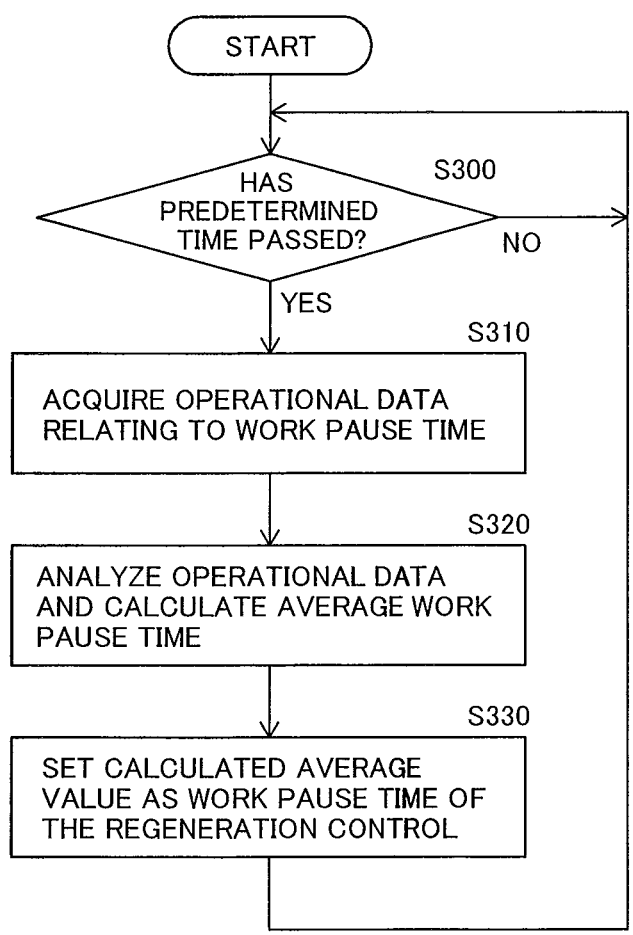
FIG. 11 is a flowchart that shows process details of work pause time calculation using operational data by the vehicle body control unit in a fourth embodiment of the present invention.

Referring to FIG. 11, the vehicle body control unit 21 judges in step S300 whether a predetermined time (say, one day) has passed since a previous setting process, and if the predetermined time has already passed, acquires in step S310 the operational data, such as the pressure sensor detection data relating to the work pause time of the hydraulic excavator, from the information storage unit 22 via the communication line 25. Next, the vehicle body control unit 21 calculates an average work pause time from analytical results on the operational data (step S320), and stores and sets the average value as the work pause time of the regeneration control (step S330).

In addition to providing substantially the same effects as those of the first embodiment, the present embodiment improves operator convenience since the work pause time during the regeneration control is automatically calculated and set without operator entry.

Other Modifications

While several embodiments of the present invention have been described above, the invention is not limited by the embodiments and can be modified in various forms without departing from the spirit of the invention. Some of the modifications are listed below.

1. In each of the above embodiments, fuel injection for the regeneration control has been conducted as the post-injection (additional injection) in the expansion stroke of the engine after main injection, but the fuel injection for the regeneration control may be conducted by providing a regeneration control fuel injector near the exhaust pipe and operating the fuel injector.

2. Each of the above embodiments has used the vehicle body control unit 21 to conduct the control arithmetic operations that create the regenerating starting signal and regenerating stopping signal of the pause time-based regeneration control and those of the manual regeneration control, but the engine control unit 4 may conduct the control arithmetic operations instead.

3. While the calculation of the filter-deposited PM amount in each of the above embodiments has been conducted using the DPF differential pressure detected by the differential pressure sensor 12, the filter-deposited PM amount may be computed by detecting state quantities of the engine 1. For example, the amount of PM deposited on the filter can likewise be calculated by providing an engine speed detection sensor, an engine load detection sensor, an exhaust gas temperature detection sensor, and the like, then reading output signal levels of these sensors, and after calculating a PM emission level "We" and a PM combustion level "Wc", deriving a PM deposition level "Wa" from "Wa=We−Wc" and adding a previous PM deposition level "Wa1" to the PM deposition level "Wa".

4. It has been described in the first embodiment that when the work pause switch 13 is operated, the regenerating requirement time and the set work pause time are compared and then if the regenerating requirement time is in excess of the set work pause time, the work pause time-based regeneration control is started. The value compared with the regenerating requirement time, however, does not need to agree with the set work pause time strictly. For example, a value nearly 20% longer or shorter than the set work pause time may be assigned as the time to be compared with the regenerating requirement time, and when the regenerating requirement time exceeds the assigned value, the work pause time-based regeneration control may be started. Compared with a case in which no limitation is provided, such a method reduces frequency of the work pause time-based regeneration control and prevents the deterioration of fuel efficiency. The same also applies in the second embodiment. That is to say, a value nearly 20% larger or smaller than the amount of filter-deposited PM that the regenerating device can burn during the set work pause time may be assigned as the value to be compared with the current amount of PM deposited on the filter, and when the current amount of PM deposited on the filter exceeds the assigned value, the work pause time-based regeneration control may be started.

5. It has been described in each of the above embodiments that the hydraulic load for increasing the exhaust gas temperature during regeneration control has been applied to the engine by providing a solenoid control valve in the hydraulic circuit and switching the solenoid control valve to a closed position. However, other methods may be used to load the engine. For example, the engine can likewise be loaded by providing a throttle valve in the exhaust pipe and narrowing down a flow passage thereof with the throttle valve.

6. The present invention, although applied to a hydraulic excavator as an example of an engineering machine in each of the above embodiments, may be applied to other engineering machines, examples of which include a wheel excavator, a crane truck, etc. Substantially the same effects as in each such embodiment can be obtained in that case as well.

What is claimed is:

1. An exhaust gas purification system for an engineering machine, comprising:

a filter disposed in an exhaust line of a diesel engine to trap particulate matter contained in exhaust gases;

a regenerating device for regenerating the filter by burning the particulate matter deposited thereon;

means for presetting a work pause time for the engineering machine;

means for notifying that the engineering machine has entered a work pause state; and regeneration control means used for operating the regenerating device for the preset work pause time when notified that the engineering machine has entered the work pause state, wherein the regeneration control means calculates a time required for the regenerating device to burn off a current amount of particulate matter deposited on the filter, and wherein the regeneration control means activates the regenerating device when the fact that the engineering machine has entered the work pause state is notified and the calculated time is longer than the preset work pause time.

2. The exhaust gas purification system for the engineering machine according to claim 1, wherein the means for notifying that the engineering machine has entered a work pause state is a first operating unit operated by an operator upon the notification of the fact that the engineering machine has entered the work pause state.

3. The exhaust gas purification system for the engineering machine according to claim 1, wherein the engineering machine includes a control lever operated during engineering work; and the means for notifying that the engineering machine has entered a work pause state includes a sensor that detects an operational state of the control lever, and means that uses detection results by the sensor to judge whether the engineering machine has entered the work pause state.

4. The exhaust gas purification system for the engineering machine according to claim 1, wherein the presetting means includes a second operating unit operated by an operator of the engineering machine, the second operating unit being used for the operator to enter the work pause time for the machine.

5. The exhaust gas purification system for the engineering machine according to claim 1, wherein the engineering machine further includes an information storage unit for storage of operational data; and the presetting means includes analytical means for analyzing at predetermined time intervals the operational data stored within the information storage unit, and calculating the work pause time of the engineering machine on the basis of analytical results.

6. An exhaust gas purification system for an engineering machine, comprising:

a filter disposed in an exhaust line of a diesel engine to trap particulate matter contained in exhaust gases;

a regenerating device for regenerating the filter by burning the particulate matter deposited thereon;

means for presetting a work pause time for the engineering machine;

means for notifying that the engineering machine has entered a work pause state; and regeneration control means used for operating the regenerating device for the preset work pause time when notified that the engineering machine has entered the work pause state, wherein the regeneration control means calculates a current amount of particulate matter deposited on the filter, and an amount of deposited particulate matter burnable during the preset work pause time by means of the regenerating device, and wherein the regeneration control means activates the regenerating device when the fact that the engineering machine has entered the work pause state is notified to the regeneration control means and the calculated current amount of deposited particulate matter is greater than the calculated amount of deposited particulate matter burnable.

7. The exhaust gas purification system for the engineering machine according to claim 6, wherein the means for notifying that the engineering machine has entered a work pause state is a first operating unit operated by an operator upon the notification of the fact that the engineering machine has entered the work pause state.

8. The exhaust gas purification system for the engineering machine according to claim 6, wherein the engineering machine includes a control lever operated during engineering work; and the means for notifying that the engineering machine has entered a work pause state includes a sensor that detects an operational state of the control lever, and means that uses detection results by the sensor to judge whether the engineering machine has entered the work pause state.

9. The exhaust gas purification system for the engineering machine according to claim 6, wherein the presetting means includes a second operating unit operated by an operator of the engineering machine, the second operating unit being used for the operator to enter the work pause time for the machine.

10. The exhaust gas purification system for the engineering machine according to claim 6, wherein the engineering machine further includes an information storage unit for storage of operational data; and the presetting means includes analytical means for analyzing at predetermined time intervals the operational data stored within the information storage unit, and calculating the work pause time of the engineering machine on the basis of analytical results.

\* \* \* \* \*